United States Patent
Shin

(10) Patent No.: US 12,231,077 B2
(45) Date of Patent: Feb. 18, 2025

(54) ROTATION APPARATUS OF POLE SYSTEM FOR PHOTOVOLTAIC POWER GENERATION

(71) Applicant: REEL TECH CO., LTD., Suncheon-si (KR)

(72) Inventor: Jeong Hoon Shin, Suncheon-si (KR)

(73) Assignee: REEL TECH CO., LTD., Suncheon-si (KR)

( * ) Notice: Subject to any disclaimer, the term of this patent is extended or adjusted under 35 U.S.C. 154(b) by 252 days.

(21) Appl. No.: 17/913,159

(22) PCT Filed: Feb. 16, 2021

(86) PCT No.: PCT/KR2021/001944
§ 371 (c)(1),
(2) Date: Sep. 21, 2022

(87) PCT Pub. No.: WO2021/206285
PCT Pub. Date: Oct. 14, 2021

(65) Prior Publication Data
US 2023/0126713 A1    Apr. 27, 2023

(30) Foreign Application Priority Data
Apr. 7, 2020 (KR) .......... 10-2020-0042437

(51) Int. Cl.
*H02S 20/32* (2014.01)

(52) U.S. Cl.
CPC .................. *H02S 20/32* (2014.12)

(58) Field of Classification Search
CPC ...................................................... H02S 20/32
See application file for complete search history.

(56) References Cited

U.S. PATENT DOCUMENTS

| 8,674,279 B1 | 3/2014 | Thel et al. |
| 2017/0093329 A1 | 3/2017 | Jensen |
| 2017/0187192 A1 | 6/2017 | Jeanty et al. |

FOREIGN PATENT DOCUMENTS

| JP | 2011-258905 A | 12/2011 |
| JP | 2014-522624 A | 9/2014 |

(Continued)

OTHER PUBLICATIONS

KR 10-0902882 B1 English translated as provided by FIT databse, translated on Jul. 27, 2024.*

(Continued)

*Primary Examiner* — Golam Mowla
(74) *Attorney, Agent, or Firm* — CANTOR COLBURN LLP

(57) ABSTRACT

Disclosed is a rotation apparatus of a pole system for photovoltaic power generation, the rotation apparatus comprising: a first tubular body connected to a solar panel array; a second tubular body coupled to a lower portion of the first tubular body and fixed on the upper end of a pole; a gear unit for transferring rotating force to the first tubular body; a driving motor for providing the gear unit with the rotating force; and a contact part of at least 3-points of contact, which is installed on coupling portions of the first tubular body and the second tubular body and maintains a contact state during the relative rotation of the first and second tubular bodies to transfer the power or a signal.

6 Claims, 6 Drawing Sheets

(56) References Cited

FOREIGN PATENT DOCUMENTS

| KR | 10-0596064 B1 | 7/2006 |
| KR | 10-0902882 B1 | 6/2009 |
| KR | 10-0961982 B1 | 6/2010 |
| KR | 10-2011-0024887 A | 3/2011 |
| KR | 10-1053982 B1 | 8/2011 |
| KR | 10-2012-0140287 A | 12/2012 |
| KR | 10-1598063 B1 | 2/2016 |
| KR | 10-2016-0086729 A | 7/2016 |
| KR | 10-1852465 B1 | 4/2018 |
| KR | 10-1935783 B1 | 1/2019 |

OTHER PUBLICATIONS

KR 10-0596064 BI English translated as provided by FIT databse, translated on Jul. 27, 2024.*
International Search Report mailed Jun. 10, 2021 for PCT/KR2021/001944.
The extended European search report for EP Application No. 21783708.7 mailed on Mar. 25, 2024.

* cited by examiner

ROTATION APPARATUS OF POLE SYSTEM FOR PHOTOVOLTAIC POWER GENERATION

TECHNICAL FIELD

The present application claims priority to Korean Patent Application No. 10-2020-0042437 filed on Apr. 7, 2020 in the Republic of Korea, the disclosure of which is incorporated herein by reference.

The present disclosure relates to a rotation apparatus of a pole system for photovoltaic power generation, and more particularly, to a rotation apparatus of a pole system for photovoltaic power generation installed at a pole to provide a rotating force to a solar panel.

BACKGROUND ART

In general, photovoltaic power generation systems are built by installing a collection of solar panels in an array over the areas of forests, fields, fallow lands, roofs of buildings, reservoirs and salt ponds.

In case that the sites for solar power plants are forests, fields or farmlands, it is necessary to perform a pre-construction process including deforestation or civil engineering on the sites prior to installing frame structures and solar panels, causing environmental degradation such as massive loss of trees and soil. Due to these negative impacts, although forests and fields meet the optimal site requirements for solar power plants, in reality, it is not easy to build solar power plants in forests and fields.

Korean Patent Publication No. 2011-0024887 discloses a self-supporting photovoltaic power generation system that is installed at rooftops of buildings or banks in a non-destructive manner. The self-supporting photovoltaic power generation system includes pillar assemblies, each including at least one pillar continuously connected to each other, and light collecting plates coupled to the top of the pillar assemblies, wherein each pillar has an inclined upper surface and a filler accommodation space in which a filler is received therein.

Korean Patent Publication No. 2016-0086729 discloses a method for installing a photovoltaic module without occupying fields and paddies, and more particularly, a photovoltaic module that is installed in paddies, comprising a lower support, an installation fixing frame and a pillar frame to easily install the photovoltaic module in fields and paddies in the non-agricultural season after harvest and a method for installing the photovoltaic module. Korean Patent Publication No. 2016-0086729 further discloses a photovoltaic module having a structure in which a plurality of easy-to-install photovoltaic modules is installed by connecting an installation fixing frame of an easy-to-install photovoltaic module to a side of a protection frame of another easy-to-install photovoltaic module with a hinge means and they are folded when not in use and extended while in use.

However, the conventional photovoltaic power generation systems still cause the destruction of nature in the construction due to the large area occupied by the frame structures which support the solar panels, and accordingly its solution is required.

Additionally, in general, the conventional photovoltaic power generation systems include solar panels fixedly installed, resulting in low photovoltaic power generation efficiency. There are some systems for tracking the movement of the Sun and orientating solar panels in the photovoltaic power generation applications, but it is not easy to build the systems due to their complicated architecture and high price.

To increase the photovoltaic power generation efficiency, it is desirable to rotate solar panels along a preset path taking the amount of sunlight into account. However, in case that a solar panel is positioned at the upper end of a pole and is simply connected to the rotation axis of a driving motor to cause it to rotate, overloads may be applied to the rotation axis of the driving motor and when external forces such as winds are applied, the connected part of the rotation axis and the solar panel is deformed or damaged and a short circuit occurs in the wiring at the rotating part, and accordingly its solution is required.

DISCLOSURE

Technical Problem

The present disclosure is designed to solve the above-described problem, and therefore the present disclosure is directed to providing a rotation apparatus of a pole system for photovoltaic power generation having a structure for rotating a solar panel using a simple driving device, thereby reducing the solar power plant installation cost, and rotating the solar panel using electricity produced from the solar panel.

The present disclosure is further directed to providing a rotation apparatus of a pole system for photovoltaic power generation for preventing deformation or damage at the connected part of the rotation apparatus and the solar panel and a short circuit in the wiring at the rotating part due to external forces such as winds.

Technical Solution

To achieve the above-described objective, the present disclosure provides a rotation apparatus of a pole system for photovoltaic power generation installed at an upper end of a pole to rotate a solar panel array, the rotation apparatus including a first tubular body connected to the solar panel array; a second tubular body coupled below the first tubular body and fixed to the upper end of the pole; a gear unit to transmit a rotating force to the first tubular body; a driving motor to provide the rotating force to the gear unit; and a contact part including at least three contact points installed at a coupled part of the first tubular body and the second tubular body and held in contact during a relative rotation between the first tubular body and the second tubular body to transmit power or a signal.

The solar panel array may include a plurality of solar panels connected in series, the contact part may include a first contact point, a second contact point and a third contact point, two terminals of output of all the plurality of solar panels may be connected to the first contact point and the second contact point, two terminals of output of some of the plurality of solar panels may be connected to the first contact point and the third contact point, an output power through the first contact point and the second contact point may be supplied to a power inverter, and an output power through the first contact point and the third contact point may be supplied to the driving motor.

The first contact point to the third contact point may include a pair of contact points, any one of which is a conducting ring and the other is a conducting block which contacts the conducting ring.

The conducting ring of the first contact point and the conducting ring of the second contact point may be arranged in concentric circles, and the third contact point may be installed at an upper position than the second contact point and may be disposed at an inner position in a radial direction from a rotation axis of the rotation apparatus.

The first contact point may be used as a common negative terminal to the second contact point and the third contact point.

The present disclosure may further include a bearing including an upper ring and a lower ring, wherein any one of the upper ring and the lower ring is connected to the first tubular body and the other is connected to the second tubular body, and the gear unit may be engaged with gear teeth along a periphery of the upper ring or the lower ring.

The bearing may be placed with a central axis of rotation perpendicular to ground, and may have gear teeth along the periphery of the upper ring, wherein the gear teeth are engaged with the gear unit, the gear unit may include a toothed wheel gear having a braking function to prevent gear disengagement, and the driving motor may be installed in the second tubular body.

Advantageous Effects

The rotation apparatus of a pole system for photovoltaic power generation according to the present disclosure has the following effects.

Firstly, the bearing and the assembly of the first tubular body and the second tubular body make it possible to firmly support the solar panel array installed at the pole and stably transmit the rotating force without swinging caused by vibrations or external forces such as winds.

Secondly, apart from power for electricity production, it is possible to draw low power from parts of the solar panel array and efficiently supply the power to the driving motor and the printed circuit board (PCB).

Thirdly, although the diameter of the first tubular body and the second tubular body is designed at the equal or similar level to the diameter of the pole, the bearing interposed between the first tubular body and the second tubular body ensures smooth rotation and precise rotation control on a second-by-second basis.

Fourthly, the rotation apparatus achieves size reduction and simple design, leading to fast return of investment, thereby overcoming the drawbacks of the existing solar tracker, a high failure rate and high price.

Fifthly, since the solar panels are supported by the pole, the solar panels are spaced a sufficient distance apart from the ground, leading to smooth air flow, thereby suppressing the temperature rise of the solar panels, resulting in increased photovoltaic power generation efficiency.

Sixthly, in case that the sites for solar power plants are forests and fields, it is possible to maintain trees around the pole which supports the solar panels, thereby minimizing the destruction of nature.

BEST MODE

Figure 1:
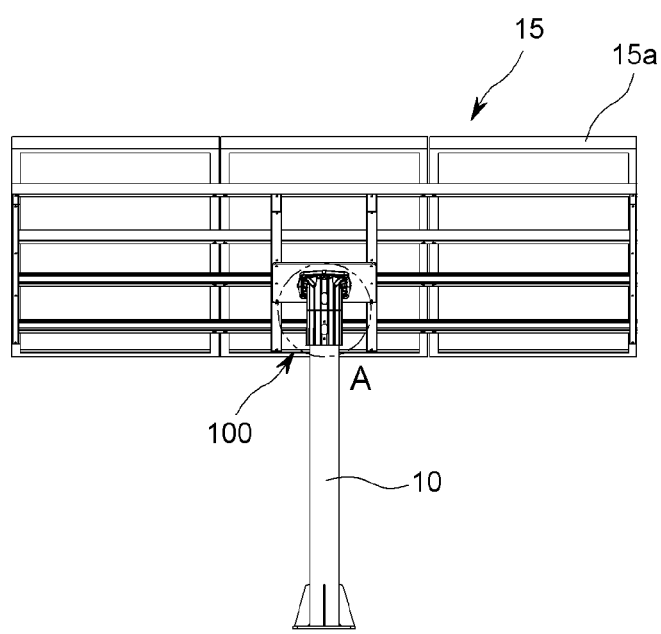
FIG. 1 is a rear perspective view showing the appearance of a rotation apparatus of a pole system for photovoltaic power generation according to a preferred embodiment of the present disclosure.
Figure 2:
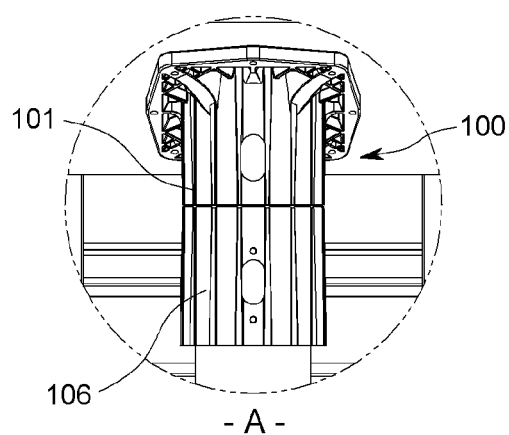
FIG. 2 is a partial enlarged diagram of the rotation apparatus in FIG. 1.
Figure 3:
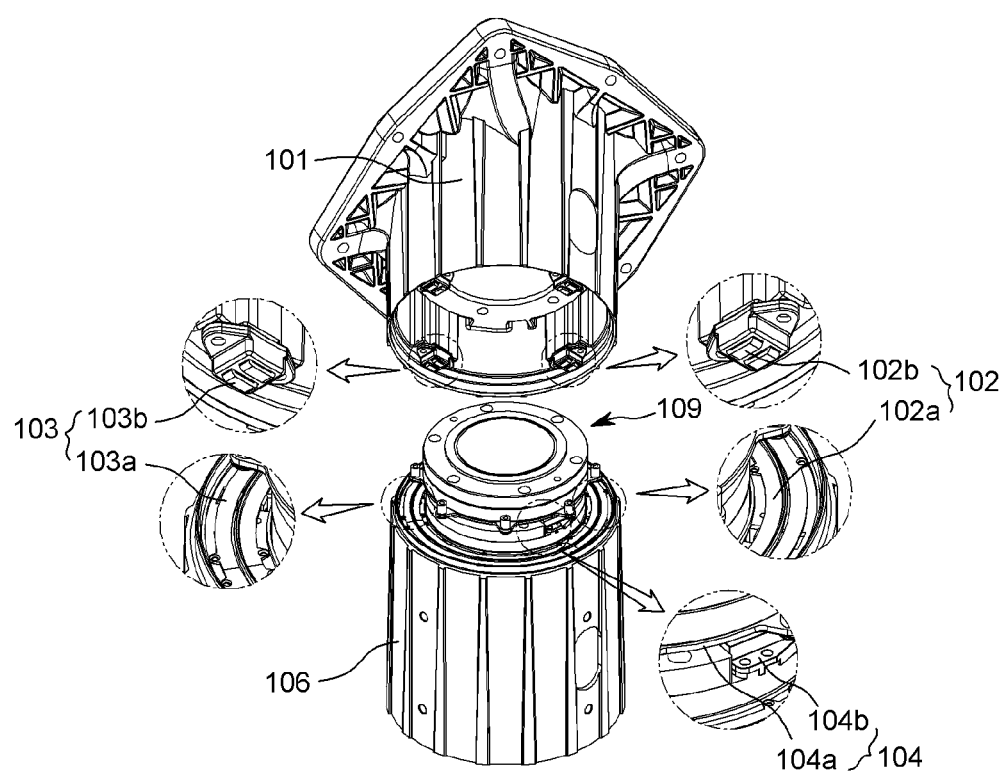
FIG. 3 is an exploded perspective view showing the internal configuration of the rotation apparatus in FIG. 2.
Figure 4:
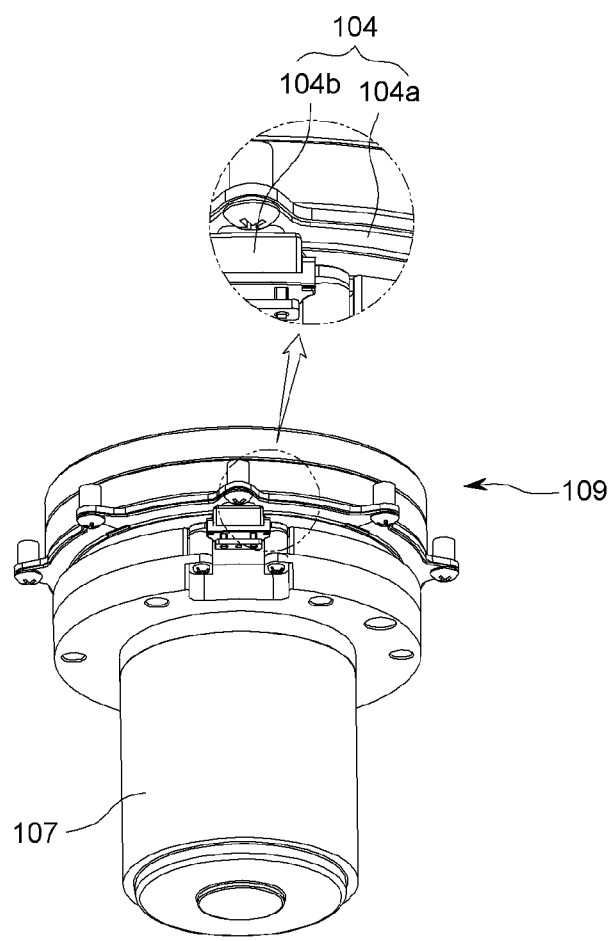
FIG. 4 is a perspective view showing the configuration of a driving motor and a first contact point in FIG. 3.
Figure 5:
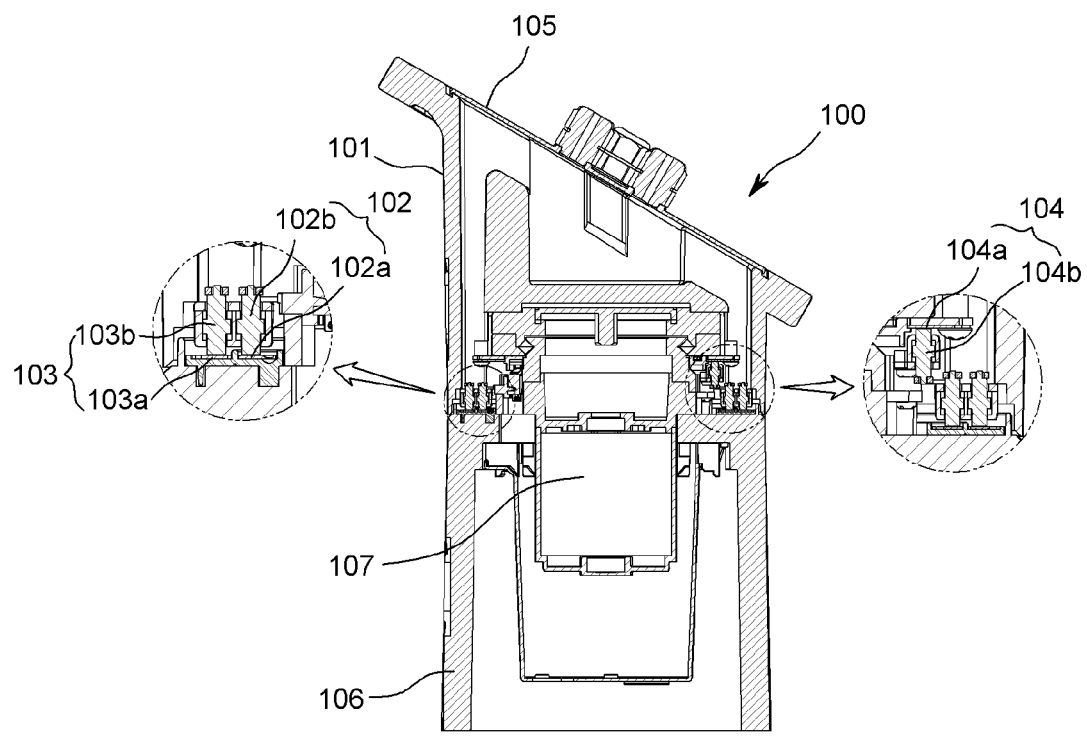
FIG. 5 is a cross-sectional view of FIG. 2.

FIG. 1 is a rear perspective view showing the appearance of a rotation apparatus of a pole system for photovoltaic power generation according to a preferred embodiment of the present disclosure, FIG. 2 is a partial enlarged diagram of the rotation apparatus in FIG. 1, FIG. 3 is an exploded perspective view showing the internal configuration of the rotation apparatus in FIG. 2, FIG. 4 is a perspective view showing the configuration of a driving motor and a first contact point in FIG. 3 and FIG. 5 is a cross-sectional view of FIG. 2.

Referring to FIGS. 1 to 5, the rotation apparatus 100 of a pole system for photovoltaic power generation according to a preferred embodiment of the present disclosure includes a first tubular body 101 connected to the rear surface of a solar panel array 15, a second tubular body 106 assembled below the first tubular body 101 with its lower end fixed to a pole 10, a driving motor 107 installed in the second tubular body 106 to provide a rotating force to the first tubular body 101, and a contact part having at least three contact points 102,103,104 installed at a coupled part of the first tubular body 101 and the second tubular body 106.

The solar panel array 15 includes a plurality of solar panels 15a connected in series.

The solar panel array 15 is mounted on an inclined surface on top of the first tubular body 101, and is installed at an angle to the ground. The installation angle of the solar panel array 15 is determined by the angle of the inclined surface.

The pole 10 is installed upright vertically from the ground with its lower end fixed to the ground by a fastening means such as an anchor bolt. Preferably, the pole 10 may be a metal tubular body having a round outer circumferential surface like a typical street light pole, and may come in a variety of other materials and shapes.

The first tubular body 101 is a pipe-shaped structure that includes a waterproof cover 105 on the obliquely inclined upper surface and has a circular circumferential surface. The waterproof cover 105 is detachably secured to open and close the internal space of the first tubular body 101.

The second tubular body 106 is a pipe-shaped structure that is assembled below the first tubular body 101 and has a circular circumferential surface. The second tubular body 106 has, at the lower end, a space into which the upper end of the pole 10 is inserted. When the pole 10 is inserted, the second tubular body 106 is fixed to the upper end of the pole.

To improve the coupling between the rotation apparatus 100 and the pole 10 and form a structurally stable assembly, the diameter of the first tubular body 101 and the second tubular body 106 may be designed at the equal or similar level to the diameter of the pole.

A predetermined bearing may be interposed between the first tubular body 101 and the second tubular body 106. The bearing is placed with its central axis of rotation perpendicular to the ground. The bearing includes an upper ring connected to the first tubular body 101 by assembly bolts to rotate with the first tubular body 101, and a lower ring assembled below the upper ring and connected and fixed to the second tubular body 106 by bolts. A plurality of balls is arranged between the upper ring and the lower ring. The upper ring of the bearing has gear teeth at a predetermined interval along the inner circumferential surface. The gear teeth on the upper ring are engaged with a gear unit 109 connected to the driving motor 107. Additionally, the lower ring of the bearing may have gear teeth that are engaged with some gears of the gear unit 109 to guide the rotation.

To minimize the occupied space, the gear unit 109 is positioned such that at least part of the gear unit 109 is inserted into the hollow of the bearing. Preferably, the gear unit 109 includes an assembly of planetary gears. The plurality of planetary gears is engaged with the gear teeth of the upper ring to transmit the power. Preferably, the gear unit 109 includes a toothed wheel gear having a braking function to prevent gear disengagement.

The driving motor 107 is fixed within the second tubular body 106, preferably, upright coaxially with the second tubular body 106 to provide the rotating force to the gear unit 109.

As shown in FIGS. 3 to 5, the first contact point 102, the second contact point 103 and the third contact point 104 for power and/or signal transmission are installed at or around the coupled part or at the contact part of the first tubular body 101 and the second tubular body 106. Although not shown in the drawing, according to a variation of the present disclosure, the rotation apparatus having more than three contact points may be provided.

Figure 6:
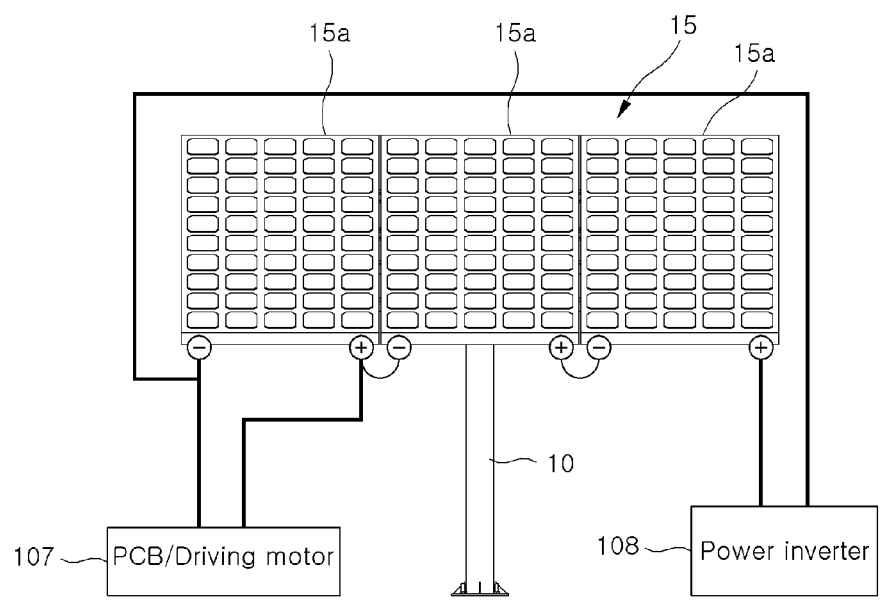
FIG. 6 is a schematic wiring diagram of a rotation apparatus of a pole system for photovoltaic power generation according to a preferred embodiment of the present disclosure.

The first contact point 102 and the second contact point 103 includes, respectively, a pair of contact points of conducting rings 102a,103a fixed in substantial connection to the second tubular body 106 and conducting blocks 102b, 103b which slide in contact with the upper surface of the conducting rings 102a,103a during the relative rotation between the first tubular body 101 and the second tubular body 106. The conducting ring 102a of the first contact point 102 and the conducting ring 103a of the second contact point 103 are arranged in concentric circles. Any one of the first contact point 102 and the second contact point 103 becomes a negative terminal and the other becomes a positive terminal. Referring to FIG. 6, two terminals of the output of all the plurality of solar panels 15a are connected to the first contact point 102 and the second contact point 103, respectively. The output power through the first contact point 102 and the second contact point 103 is supplied to a power inverter 108 and is used to generate power.

The third contact point 104 includes a pair of contact points of a conducting ring 104a which is fixed to the rotating part of the gear unit 109 above the first contact point 102 and the second contact point 103 to rotate with the first tubular body 101 and a conducting block 104b which slides in contact with the lower surface of the conducting ring 104a during the relative rotation between the first tubular body 101 and the second tubular body 106.

The third contact point 104 is electrically connected to the positive terminal drawn from the output of some (for example, the output terminal of one solar panel 15a) of the plurality of solar panels 15a of the solar panel array 15. The output power through the third contact point 104 is used as power for the operation of the driving motor 107 and a predetermined printed circuit board (PCB). Preferably, the third contact point 104 is disposed at the inner position in the radial direction from the rotation axis of the rotation apparatus, i.e., closer to the driving motor 107 than the second contact point 103 to supply the power to the driving motor 107 and the PCB.

Preferably, the first contact point 102 is used as the common negative terminal to the second contact point 103 and the third contact point 104.

The electrical polarity assigned to the first contact point 102 to the third contact point 104 is not limited to the above-described embodiment and a variety of modifications may be made thereto.

The rotation apparatus 100 of a pole system for photovoltaic power generation configured as described above provides the rotating force of the driving motor 107 to the gear unit 109 to rotate the first tubular body 101, causing the solar panel array 15 fixed to the upper end of the first tubular body 101 to slowly rotate. The first tubular body 101 rotates relative to the second tubular body 106 fixed to the pole 10 while stably supporting the solar panel 15a. The bearing interposed between the first tubular body 101 and the second tubular body 106 ensures structurally stable and smooth rotation. Preferably, the rotation path of the solar panel 15a is set to allow the solar panel 15a to be exposed to the Sun as much as possible taking the amount of sunlight into account. When the solar panel 15a rotates at a constant speed for a predetermined time, compared to the solar panel 15a placed in a fixed position facing the same direction, it is possible to increase the amount of solar power generated without using a solar tracker of a complicated structure.

Additionally, in addition to the solar panel array 15, the pole system for photovoltaic power generation including the rotation apparatus 100 according to the present disclosure may include a vertically movable lighting unit and a vertically movable closed circuit television (CCTV) camera unit. In this case, when the lighting unit and the CCTV camera unit are lifted up as a first lifting wire and a second lifting wire are rolled up by the forward rotation of a drum embedded in a body of each unit and coupled to each body disposed at the upper part of the pole 10, power may be supplied to the lighting unit and the CCTV camera unit by the contact between an upper contact point and a lower contact point embedded in each body. Here, the power for the operation of the lighting unit and the CCTV camera unit may be, for example, supplied through the first contact point.

In the rotation apparatus 100 of a pole system for photovoltaic power generation according to the present disclosure, the rotating force from the driving motor 107 in operation is transmitted to the bearing through the gear unit 109 to cause the upper ring of the bearing to rotate, and at the same time, the first tubular body 101 connected to the upper ring to rotate, so the solar panel array slowly rotates. The first tubular body 101 rotates relative to the second tubular body 106 fixed to the pole while stably supporting the solar panel array.

The gear unit 109 is engaged with the gear teeth along the periphery of the upper ring of the bearing to transmit the rotating force, and the upper ring is connected to the first tubular body 101 and rotates with the first tubular body 101. The first tubular body 101 rotates with the solar panel array fixed to the upper surface thereof. In this instance, the gear unit 109 is positioned such that at least part of the gear unit 109 is inserted into the hollow of the bearing, thereby maximizing the space utility efficiency.

Accordingly, when the present disclosure is applied, it is possible to achieve the power source for photovoltaic power generation with high efficiency by stably rotating the solar panel 15a installed at the upper end of the pole 10.

As shown in FIG. 6, the output power from all the plurality of solar panels 15a is transmitted to the power inverter 108 through the first contact point 102 and the second contact point 103 to produce solar energy of, for example, 72V to 120V.

Additionally, the output power from some (for example, the output terminal of one solar panel 15a) of the plurality of solar panels 15a is transmitted to the driving motor 107 and the PCB through the first contact point 102 and the third contact point 104 to supply the driving power of, for example, 24V to 40V.

Since the diameter of the first tubular body 101 and the second tubular body 106 is much larger than the diameter of the rotation axis of the driving motor, the assembly of the first tubular body 101 and the second tubular body 106 combined with the solar panel 15a can stably transmit the rotating force, compared to the prior art that simply connects the solar panel to the rotation axis of the driving motor to rotate the solar panel. That is, it is possible to transmit the rotating force of the driving motor to the solar panel 15a without an error even though vibrations generated from the driving motor or external forces such as winds are applied.

INDUSTRIAL APPLICABILITY

When the present disclosure is applied, by virtue of the contact part having three contact points at the coupled part of the first tubular body and the second tubular body of the rotation apparatus, aside from power for electricity production, it is possible to draw low power of about a few tens of volts from parts of the solar panel array and efficiently supply the power to the driving motor and the printed circuit board (PCB).

What is claimed is:

1. A rotation apparatus of a pole system for photovoltaic power generation installed at an upper end of a pole to rotate a solar panel array, the rotation apparatus comprising:
   a first tubular body connected to the solar panel array;
   a second tubular body coupled below the first tubular body and fixed to the upper end of the pole;
   a gear unit to transmit a rotating force to the first tubular body;
   a driving motor to provide the rotating force to the gear unit; and
   a contact part including at least three contact points installed at a coupled part of the first tubular body and the second tubular body and held in contact during a relative rotation between the first tubular body and the second tubular body to transmit power or a signal,
   wherein the solar panel array includes a plurality of solar panels connected in series,
   wherein the contact part includes a first contact point, a second contact point and a third contact point,
   wherein two terminals of output of all the plurality of solar panels are connected to the first contact point and the second contact point,
   wherein two terminals of output of some of the plurality of solar panels are connected to the first contact point and the third contact point, and
   wherein an output power through the first contact point and the second contact point is supplied to a power inverter, and an output power through the first contact point and the third contact point is supplied to the driving motor.

2. The rotation apparatus of a pole system for photovoltaic power generation according to claim 1, wherein each of the first contact point to the third contact point includes a pair of contact points, any one of which is a conducting ring and the other is a conducting block which contacts the conducting ring.

3. The rotation apparatus of a pole system for photovoltaic power generation according to claim 2, wherein the conducting ring of the first contact point and the conducting ring of the second contact point are arranged in concentric circles, and
   wherein the third contact point is installed at an upper position than the second contact point, and is disposed at an inner position in a radial direction from a rotation axis of the rotation apparatus.

4. The rotation apparatus of a pole system for photovoltaic power generation according to claim 2, wherein the first contact point is used as a common negative terminal for the second contact point and the third contact point.

5. The rotation apparatus of a pole system for photovoltaic power generation according to claim 2, further comprising:
   a bearing including an upper ring and a lower ring, wherein any one of the upper ring and the lower ring is connected to the first tubular body and the other is connected to the second tubular body,
   wherein the gear unit is engaged with gear teeth along a periphery of the upper ring or the lower ring.

6. The rotation apparatus of a pole system for photovoltaic power generation according to claim 5, wherein the central rotation axis of the bearing is perpendicular to ground, and the bearing has gear teeth along the periphery of the upper ring, wherein the gear teeth are engaged with the gear unit,
   wherein the gear unit includes a toothed wheel gear having a braking function to prevent gear disengagement, and
   wherein the driving motor is installed in the second tubular body.

* * * * *